(12) United States Patent
Dean

(10) Patent No.: US 7,702,380 B1
(45) Date of Patent: Apr. 20, 2010

(54) SYSTEM AND METHOD FOR PRODUCING A THREE-DIMENSIONAL MODEL

(75) Inventor: Howard David Dean, Shaker Heights, OH (US)

(73) Assignee: Case Western Reserve University, Cleveland, OH (US)

(*) Notice: Subject to any disclaimer, the term of this patent is extended or adjusted under 35 U.S.C. 154(b) by 2088 days.

(21) Appl. No.: 10/129,308

(22) PCT Filed: Nov. 3, 2000

(86) PCT No.: PCT/US00/41821

§ 371 (c)(1),
(2), (4) Date: Sep. 3, 2002

(87) PCT Pub. No.: WO01/33511

PCT Pub. Date: May 10, 2001

Related U.S. Application Data

(60) Provisional application No. 60/163,323, filed on Nov. 3, 1999.

(51) Int. Cl.
*A61B 5/05* (2006.01)
(52) U.S. Cl. .................. 600/426; 600/414; 600/410; 378/21; 382/128; 382/131; 382/171; 382/172; 382/181; 382/173
(58) Field of Classification Search .................. 600/426, 600/414, 410; 378/21; 382/128, 131, 171, 382/172, 173, 181
See application file for complete search history.

(56) References Cited

U.S. PATENT DOCUMENTS

| 4,436,684 A | 3/1984 | White |
| 5,274,565 A | 12/1993 | Reuben |
| 5,357,429 A | 10/1994 | Levy |
| 5,554,190 A | 9/1996 | Draenert |
| 5,741,215 A * | 4/1998 | D'Urso .................. 600/407 |

(Continued)

FOREIGN PATENT DOCUMENTS

GB          324 470 A    10/1998

OTHER PUBLICATIONS

International Preliminary Examination Report corresponding to International Application No. PCT/US00/41821.
International Search Report in connection with International Application No. PCT/US00/41821.
Zachow, S. et al., "Optimized arrangement of osseointegrated implants: a surgical planning system for the fixation of facial prosthesis" Proceedings of 13th International Symposium on Computer Assisted Radiology and Surgery (Cars '99), Paris, France, 23-26, Jun. 1999, XP001011404 1999, Amsaterdam, Netherlands, Elsevier Science, Netherlands ISBN: 0-444-50290-4 sections 3, 3.1-3.3.

(Continued)

*Primary Examiner*—Brian Casler
*Assistant Examiner*—John F Ramirez
(74) *Attorney, Agent, or Firm*—Benesch Friedlander Coplan & Aronoff, LLP

(57) ABSTRACT

A shape of a medical device to be implanted into a subject is verified by acquiring a plurality of inter-fiduciary marker dimensions from the subject. Three-dimensional image data of the markers and a tissue of interest, included in the subject, is obtained. Respective measurements between the fiduciary markers around the subject and in the image data are confirmed. The tissue of interest and the fiduciary markers are identified in the image data. Points of the tissue of interest and the fiduciary markers are rendered as a 3-dimensional surface representation. A 3-dimensional model of the tissue of interest and the fiduciary markers is generated as a function of the surface representation. A shape of the medical device to be implanted into the subject is determined as a function of the 3-dimensional model.

19 Claims, 5 Drawing Sheets

U.S. PATENT DOCUMENTS

| | | | | |
|---|---|---|---|---|
| 5,752,962 | A | * | 5/1998 | D'Urso ..................... 606/130 |
| 5,768,134 | A | | 6/1998 | Swaelens et al. |
| 6,146,390 | A | * | 11/2000 | Heilbrun et al. ............ 606/130 |
| 6,254,639 | B1 | * | 7/2001 | Peckitt .................... 623/11.11 |
| 6,327,491 | B1 | * | 12/2001 | Franklin et al. ............ 600/429 |
| 6,445,943 | B1 | | 9/2002 | Ferre et al. |
| 6,470,207 | B1 | * | 10/2002 | Simon et al. ............... 600/426 |
| 6,937,696 | B1 | * | 8/2005 | Mostafavi ................... 378/95 |
| 2001/0027271 | A1 | * | 10/2001 | Franck et al. .............. 600/426 |
| 2004/0167390 | A1 | * | 8/2004 | Alexander et al. .......... 600/410 |

OTHER PUBLICATIONS

Noordsman, H.J., et al., "Localisation of subdural EEG electrode bundles in an interactive volume rendering framework" Medical Image Computing and Computer-Assisted Intervention—MICCAI '99. Second International Conference. Proceedings (Lecture Notes in Computer Science vol. 1679), Cambridge, UK, Sep. 19-22, 1999, pp. 734-741 XP001011391 1999, Berlin, Germany, Springer-Verlag, Germany, ISBN: 3-540-66503-X abstract.

Wells, W., et al., "Video registration using fiducials for surgical enhanced reality" Proceedings of the Annual International Conference of the Engineering in Medicine and Biology Society, US, New York, IEEEm vol. CONF. 15, Oct. 28, 1993, pp. 24-25, XP000431483.

Article entitled "Biomedical applications"; found at: HTTP:\\WWW.IFI.UNIZH.CH/STAFF/ZOLLI/cap/BIOMEDICAL.HTM.

Dean, H.D., et al, "Comparison of Traditional Brain Segmentation Tools with 3D SElf-Organizing Maps".

Sailer, H.F., et al. "The value of stereolithographic models for preoperative diagnosis of craniofacial deformities and planning of surgical corrections", Int. J. Oral Maxillofac. Surg. 1998; 27: 327-333 ISSN 0901-5027.

* cited by examiner

SYSTEM AND METHOD FOR PRODUCING A THREE-DIMENSIONAL MODEL

This application claims the benefit of U.S. Provisional Application No. 60/163,323, filed Nov. 3, 1999.

BACKGROUND OF THE INVENTION

The present invention relates to fabricating implants to replace bony structures. More specifically, the invention relates to a system and methodology for fabricating a "drop in" (i.e., the prosthetic's fit is prefabricated taking into account all of the subject's anatomy surrounding the site where it will sit) quality replacement for a particular segment of missing bony structure, in which the implant fits precisely replacing the contours of the missing segment and thus minimizes length and complications during the surgical procedure to install the implant, and subsequently facilitates the healing process. Current standard of care is to mass produce a "shape" that matches the patient's anatomy in only few dimensions that are obtained by external measurements. Often parts of the patient's anatomy must be removed to get a good fit. Anything else is referred to as a "custom tooling" device by the FDA. This patent presents a method to prefabricate a custom (i.e., fits all dimensions of the defect site) prosthetic from imaging data. The implant requires only placement and minimal fixation by the attending clinician. It will be appreciated, however, that the invention is also amenable to other like applications.

Various systems and methods of fabricating prosthetic implants are known in the prior art. Examples of such prior systems and methods include U.S. Pat. Nos. 4,436,684; 5,274,565; 5,357,429; 5,554,190; 5,741,215; and 5,768,134. Each of these patents, however, suffer from many disadvantages that have collectively limited the usefulness of their methods and implants to the relevant field.

The primary disadvantage of these methods is that they do not provide a mechanism for ensuring that the implant will be a "drop in" replacement for the missing bony material. More specifically, the implant may not be the correct shape and/or size and, therefore, not properly fit the prosthetic into the patient. Without a proper fit, there can be a wide variety of complications with the implant, including complications that arise during the surgical process as well as during the healing process. Ultimately, these complications may result in the patient experiencing pain, disuse, atrophy, implant or surrounding structure mechanical failure, and/or the body rejecting the implant. Thus, it is a critical disadvantage of these prior art systems and methods that they do not provide the ability to ensure a custom fit, "drop in" replacement for the missing body segment.

The present invention provides a new and improved apparatus and method which overcomes the above-referenced problems and others.

SUMMARY OF THE INVENTION

A method for creating a 3-dimensional model of a tissue of interest, included within a subject, and a plurality of fiducials positions the fiducials in a fixed relationship to the subject. Data representing a volume image of the fiducials and the tissue of interest is obtained. Respective measurements between the fiducials in the fixed relationship to the subject and in the image data are validated. The tissue of interest and the fiducials are segmented from the image data. Points of the tissue of interest and the fiducials are rendered as a 3-dimensional surface representation. The 3-dimensional model of the tissue of interest and the fiducials is created as a function of the surface representation.

In accordance with one aspect of the invention, the positioning of the fiducials includes placing markers on the subject. The markers have a density for creating an identifiable spot in the volume image.

In accordance with another aspect of the invention, the positioning of the fiducials includes placing a frame of markers, which have a density for creating an identifiable spot in the volume image, around the tissue of interest.

In accordance with another aspect of the invention, the validating includes comparing distances between the markers in the fixed relationship to the subject and in the image data.

In accordance with another aspect of the invention, positional errors detected in the validating step are mathematically corrected.

In accordance with another aspect of the invention, respective measurements between the fiducials in the fixed relationship to the subject and in the surface representation are validated.

In accordance with a more limited aspect of the invention, respective measurements between the fiducials in the fixed relationship to the subject and in the 3-dimensional model are validated.

In accordance with another aspect of the invention, the image data is interpolated for smoothing the surface representation.

In accordance with another aspect of the invention, the fiducials are bridged to the tissue of interest.

One advantage of the present invention is that a drop in implant is created.

Another advantage of the present invention is that an implant having substantially the correct shape and/or size is created.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
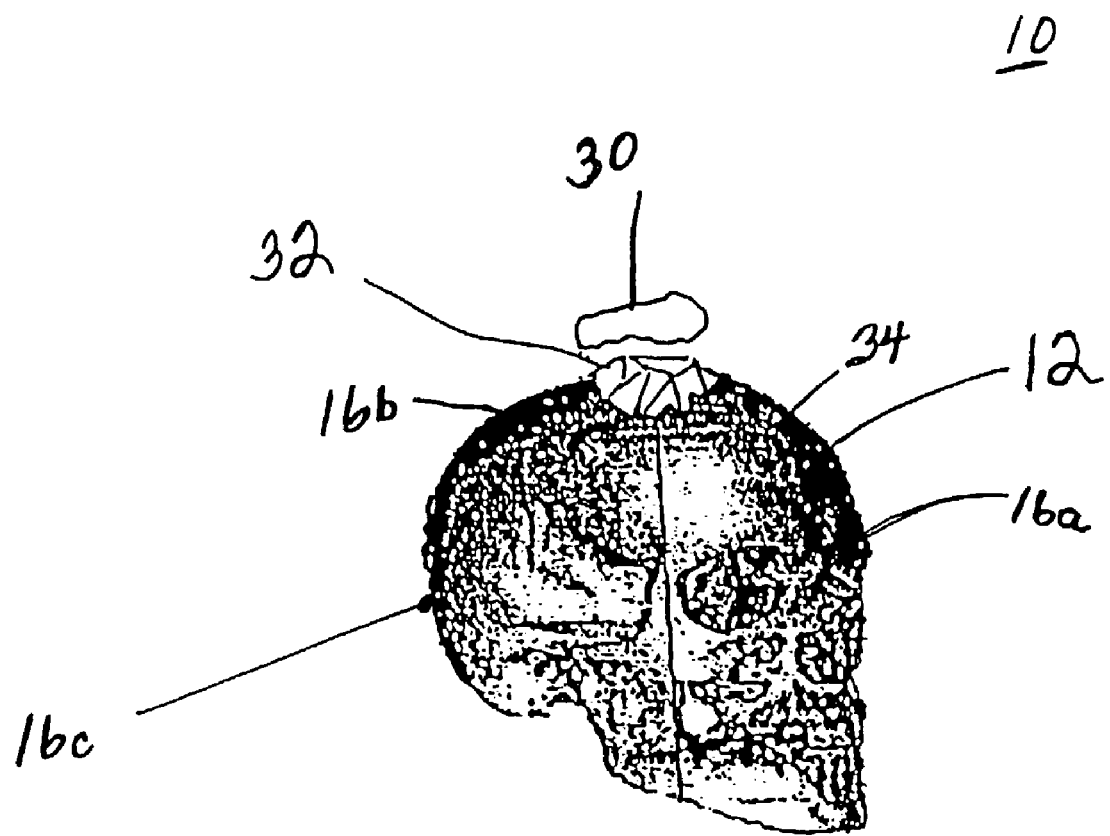
FIG. 1 illustrates a three-dimensional model according to the present invention.
Figure 2:
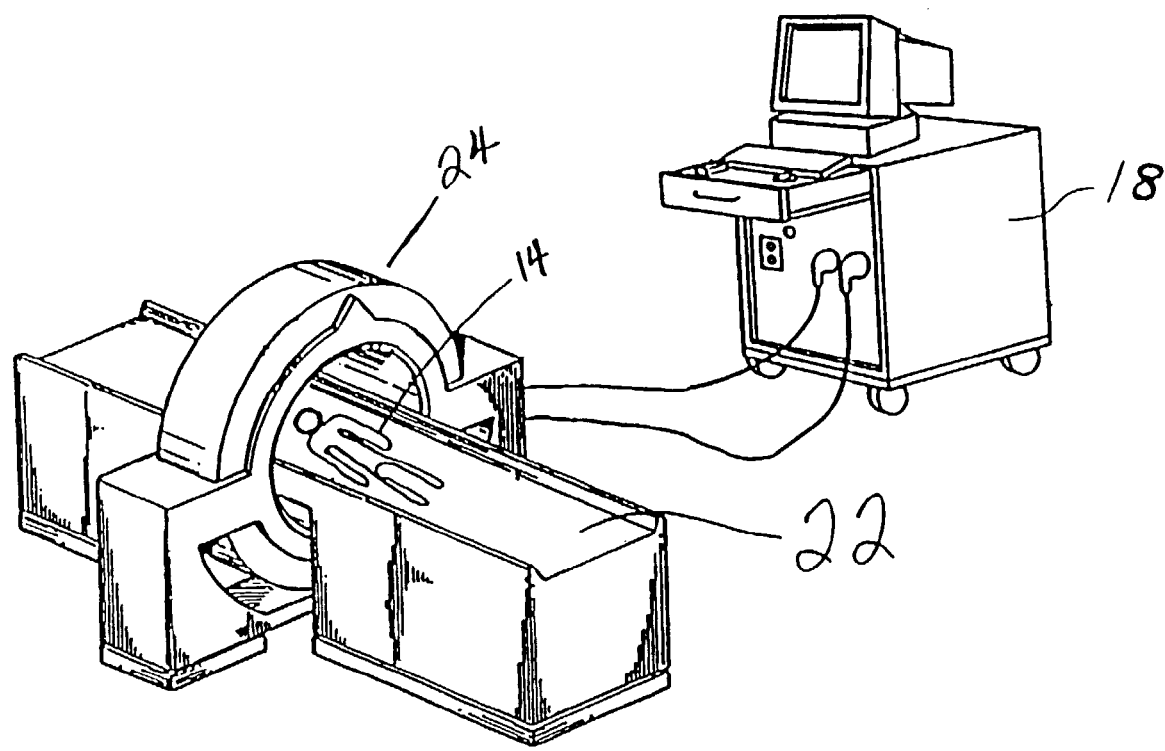
FIG. 2 illustrates a system for acquiring a three-dimensional image as source data for a hard model of the patient's anatomy according to the present invention.
Figure 3:
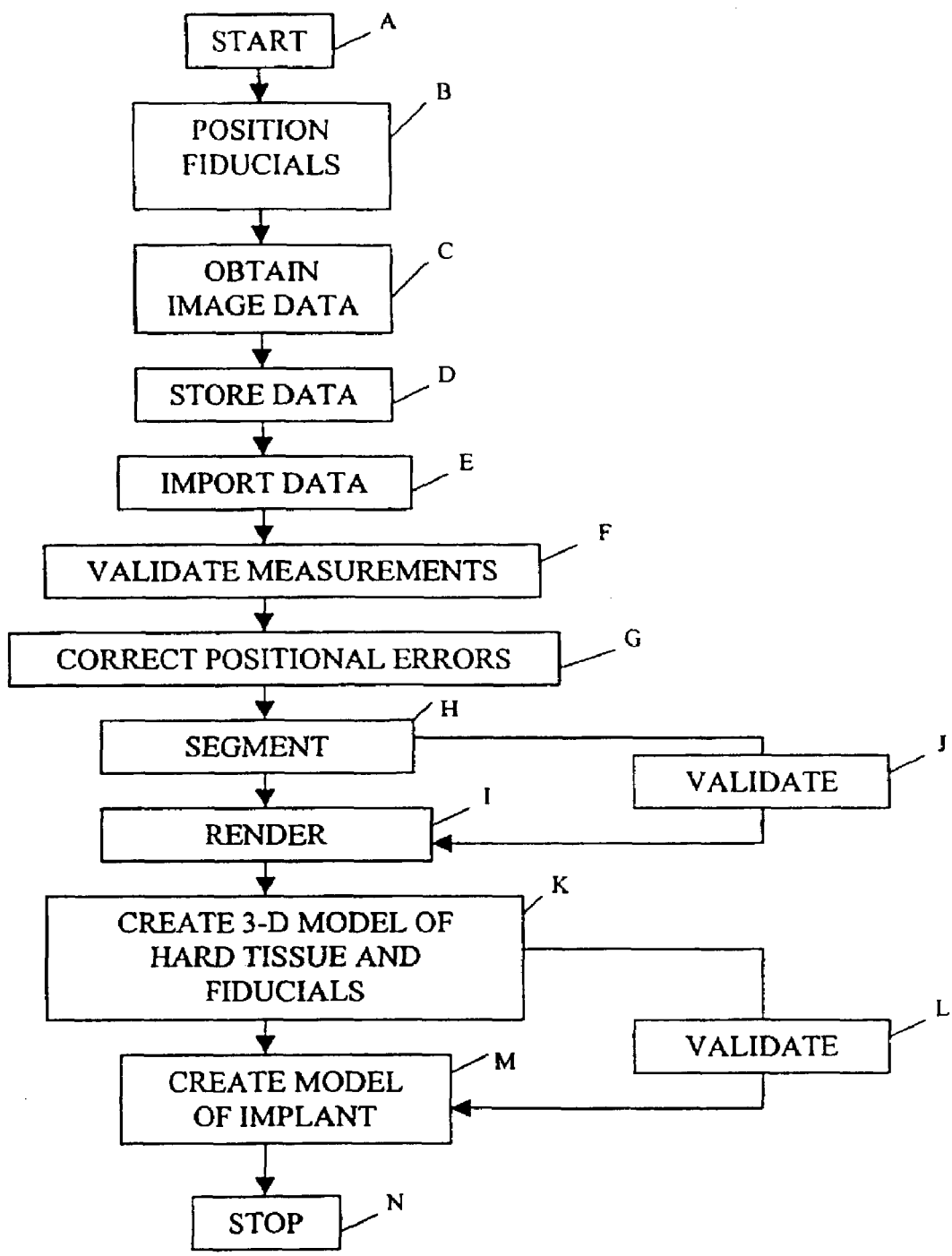
FIG. 3 illustrates a flowchart for creating a three-dimensional model according to the present invention.
Figure 4:
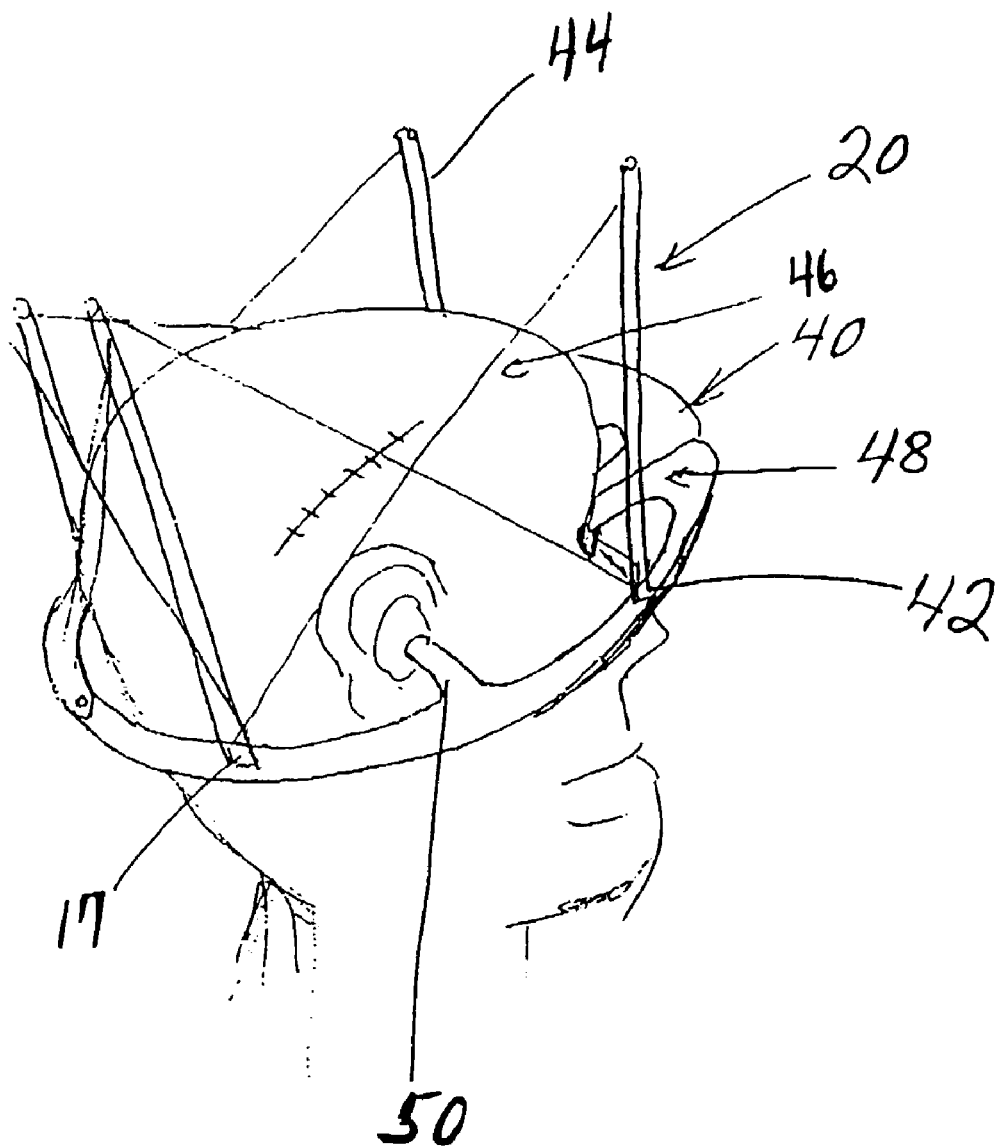
FIG. 4 illustrates a frame to which fiducials are attached according to the present invention.

With reference to FIGS. 1-3, a method for creating a 3-dimensional model 10 of a hard tissue of interest 12, which is included within a subject 14, and a plurality of fiducials 16a, 16b, 16c begins in a step A. The hard tissue of interest 12 may include bony structure (e.g., a skull) in the subject 14. The frameless approach to creating fiduciary distances is to position fiducial markers 16, in a step B, in a fixed relationship to the subject 14. In the preferred embodiment (i.e., a frameless technique), the fiducials 16 are spherical markers (e.g., about 1.5 mm thick and including a lead material) placed (adhesed) around a defect 32 on the subject 14. In the preferred embodiment, three (3) fiducials 16 are used. However, additional fiducials may be used, especially if there is any concern that muscles of the subject's 14 facial expression might twitch the marker site during a scan. Alternatively, with reference to FIG. 4, which will be discussed in more detail below, fiducials 17 are included as markers secured to a frame 20 that is placed around the hard tissue of interest 12. In either embodiment, it is to be understood that the fiducials 16, 17 have a density that is high enough to create an identifiable spot in an image volume. Once the fiducials 16, 17 are positioned, precise measurements of the distances between the markers is recorded using, for example, calipers.

With reference again to FIGS. 1-3, a processing system 18 obtains and processes data for producing images of the subject 14 and an implant, which will be discussed below. Data, which represents a volume (3-dimensional) image of the fiducials 16 and the hard tissue of interest 12, is obtained during a scan in a step C. Because the image data represents a 3-dimensional image, it may be referred to as voxel data. Preferably, the step C of obtaining the image data includes imaging the subject 14, which is positioned on a table 22 in a gantry 24, using a computerized-tomography (CT) scanner according to a particular protocol. The table 22 and gantry 24 are controlled by the processing system 18. In the preferred embodiment, selected parameters of the protocol include: a 1.5 mm slice thickness with a 1.5 mm table increment; 256 mm field-of-view; gantry tilt of zero (0) degrees; and kVp and mAs settings chosen by a trained technician to highlight hard tissue (e.g., bone) details in the subject 14. Other aspects of the scan are also part of the preferred protocol. The CT data is typically about 512×512 by 100 slices at 12-bit resolution and represents about 50 MBytes of data. It is important to realize that subject movement during the step C (i.e., during the imaging process), may cause positional errors between the fiducials 16 in the image data. Therefore, if a subject is restless or likely to fidget (e.g., if the subject is a young child or unable to hold sufficiently still), twilight sleep (e.g., light sedation), or if necessary general anesthetic, may be used.

Once the image data (e.g., the CT image data) is captured in the step C, it is stored on a transportable medium in a step D. Alternatively, the image data are also transferred over a network where physically possible and security concerns allow. Then, the image data is imported, in a step E, into a computerized 3-dimensional segmentation process, which occurs here in the AUTO program. More details of the AUTO program will be discussed in more detail below. It is to be understood that the image data is typically converted into a form that is compatible with the AUTO program.

Respective measurements between the fiducials 16, or on an imaging frame, in the fixed relationship to the subject 14 and in the image data are validated (confirmed) in a step F. More specifically, comparisons of respective distances are made between the markers 16 in the fixed relationship to the subject 14 and in the image data to insure that the segmentation exercise has not introduced any inaccuracies in the image data that proceeds to the next step. The comparisons made during the step F may indicate that positional errors are present in the image data (e.g., if the distances between the fiducials 16 in the image data do not correspond to the distances between the fiducials 16 around the subject 14). If such inaccuracies are present in the image data, mathematical operations are performed, in a step G, for correcting the positional errors.

The tissue, in this example the bony skull, of interest 12 and the fiducials 16 are segmented (identified) from the image data in a step H. More specifically, an operator uses the AUTO program to segment the hard tissue of interest 12 (bony structure) of the subject 14 and the fiducials 16 away from the non-hard tissue material (non-bony structure). An operator of the system 18 manually marks (identifies) (e.g., with a pointing device such as a mouse) pixels within the image data that represent the hard tissue 12, fiducials 16, and/or frame 20. In, for example, the image shown in FIG. 1, only pixels included in the skull 12 are marked while the pixels included in interior sinus surfaces, the cranial base, zygoma, etc. are unmarked.

The operator may use a 3-D region-growing algorithm to segment the bony objects in the volume and to label the fiducial markers 16. The operator reviews the segmentation results slice-by-slice. If needed, the operator uses 2-D region growing algorithms and manual methods to add or remove regions from the 3-D automatic segmentation. The operator adds bridges to connect the segmented fiducial markers to the segmented skull. Initially, the region-growing algorithms will be based on voxel intensity. A later algorithm will use the zero-crossing of the second derivative of voxel intensity. Initially, the segmentation will be voxel-by-voxel. Since the resolution of the CT data is artificially increased, this simulates sub-pixel segmentation. Later methods will use vectors to describe the segmented region boundaries. These later methods will permit sub-pixel segmentation without artificially increasing the resolution.

The AUTO program includes additional operations that apply to the entire image volume:

NEGATE VOLUME: Reverses the data values for all voxels. If $v_{xyz}$ is the internal representation of a voxel value, the new voxel value is $(254-v_{xyz})$, where grayscale is encoded from 0-255 (other grayscale ranges would work equally well).

MIRROR VOLUME: Reverses the order of the voxels in the x-dimension. Normally, the x-dimension is aligned with the subject's left-right axis. If so, this is the same as a left-to-right reversal of the volume. If the x-dimension corresponds to some other patient axis, this is the same as a left-to-right reversal and volume rotation.

UNMARK MASK LAYER: Convert marked voxels (i.e. those with data value 255) to data value 254.

SWAP BACKUP: Exchanges the working copy of the volume with the backup copy.

RESTORE BACKUP: Replaces the working copy of the volume with the backup copy.

ASSIGN TO BACKUP: Replaces the backup copy of the volume with the working copy.

ETCH VOLUME: Sets all unmarked voxels (i.e. those with data values other than 255) to data value 0. The resultant volume consists only of the marked voxels.

NON-ETCH VOLUME: Sets all marked voxels (i.e. those with data value 255) to data value 0. In essence, this removes the marked voxels from the volume.

AVERAGE VOLUME: Performs a linear smoothing operation on the voxel data values in each slice of the volume. The kernel size varies from "3" to "15". The kernel is three-dimensional and all components of the filter have equal weighting. For example, if the kernel size is 5, the kernel is a 5×5×5 matrix and each component has a value of 0.008(=1/125). It is not known if such a filter compensates for non-isotropic volumes.

SMOOTH VOLUME: Performs a non-linear smoothing operation on the voxel data values in each slice of the volume. The non-linear smoothing operation appears to be the median value of the voxels considered, but it may be a morphological operation. The behavior of this operation does not appear to be affected by the setting of the Kernel Size slider.

EQUALIZE VOLUME: By itself, this has no noticeable effect on the volume data. This is used in conjunction with Normalize Volume.

NORMALIZE VOLUME: Performs a histogram equalization of the voxel values. If EQUALIZE VOLUME has been executed prior to this operation, the background voxels are ignored, producing a visually more pleasing result.

ALIGN SLICES: This operation does not produce any observable results. This may be a disabled or abandoned feature or it may be a placeholder for a future volume operation.

Although the AUTO program is predominately run in a "manual mode," the program includes several algorithmic techniques for speeding the segmentation process (e.g., volume editing). Volume editing may include volumetric region growing, volume ROI and volume non-ROI, and replanarization:

VOLUMETRIC REGION GROWING: After selecting a voxel from an image in the work window, the AUTO program can find all connected voxels with similar data values. The algorithm looks not only within the image in the work window, but through the entire volume. A GROWTH FACTOR slider is available to control the meaning of "similar." All selected voxels are marked (i.e. their data value is set to 255).

VOLUME ROI and VOLUME NON-ROI: It is expected that this should apply an image editing operation (such as mark, erase, boost, et cetera) across the full volume, but these controls do not have any visible effect. These functions may be disabled or the rules for using these may not be understood yet.

REPLANARIZATION: The AUTO program can produce planar images orthogonal to any of the orthogonal MPR views along arbitrary cuts. The range of angles supported is restricted. Currently, no 3-axis oblique cuts are permitted, but are envisioned. Only one planar image is produced.

The AUTO program includes many options for an operator to display and manipulate an image:

Look-Up Tables

A plurality of Look-up Tables (LUTs) are used to map the image data values to the colors displayed on the screen. A Normal LUT maps ascending data values to grayscale values from black to white; a Pseudo LUT maps ascending data values to a color ramp that varies smoothly from black to rose to blue to violet to green to yellow to cyan to white. Reversed versions of both of these LUTs are available.

MPR Views

The volume data is presented in three orthogonal views, commonly called an orthogonal Multi-Planar Reconstruction (MPR). The X-Y plane presents the individual slices from the volume. The Y-Z and X-Z planes show orthogonal planes perpendicular to the X-Y plane and aligned with the image matrix axes. The Y-Z and X-Z planes are scaled according to the value of the slice-per-pixel ratio. Linear interpolation is used to expand the orthogonal views if the volume is non-isotropic.

The operator can scroll or loop through the volume in any of the MPR views. The operator may also automatically scroll through the volume in any of the MPR views. The operator may select the range of slices (or cross-sections) covered by the scrolling operations.

The operator may get a quick, reduced resolution view of all of the slices in the volume. The slices are shown starting with the first slice of the scroll range.

Any image in any one of the MPR views may be "ported" to the image work window for editing.

Working View

The working view, also referred to as the work window, is where all image editing operations are performed. The work window has controls for:

Enlarging or decreasing the size of the image in the work window. There are constraints on the maximum and minimum sizes.

The overall brightness of the image may be raised or lowered.

Changing the view to the next or previous image in the volume.

Planar region growing.

Committing the changes made to the image in the work window. This replaces the slice in the volume with the edited version in the work window.

Restoring slice image. This replaces the image in the work window with the image from the work volume. This undoes any edits made since porting the image to the work window.

Histogram View

The histogram view shows both a cumulative histogram and a binning histogram of the image in the work window. The cumulative histogram shows a plot of the percentage of pixels at a given pixel value or lower. The binning histogram shows a plot of the pixels at a given pixel value.

The operator may select the pixel data value range depicted by the histogram plots. When adjusting the range, the image in the work window is modified to show only the pixels in that range. Pixels with data values below the selected range are displayed as a first color and pixels with data values above the selected range are displayed as a second color.

Image Operations

These operations pertain to the image slice in the image work window.

EQUALIZE SLICE: By itself, this has no noticeable effect on the pixel data. This is used in conjunction with Normalize Slice.

NORMALIZE SLICE: Performs a histogram equalization of the pixel values. If EQUALIZE SLICE has been executed prior to this operation, the background pixels are ignored, producing a visually more pleasing result.

Image Editing

PLANAR REGION GROWING: After selecting a pixel of an image in the work window, the AUTO program can find all connected pixels with similar data values. A GROWTH FACTOR slider is available to control the meaning of "similar". All selected pixels are marked (i.e. their data value is set to 255).

ROI EDITING: The operator may define a rectangular or irregularly-shaped Region Of Interest (ROI). The operator may apply one of five editing operations to the pixels contained with the ROI. The editing operations are Mark (set value to 255), Erase (set value to 0), RubOut (restore pixel value), Backup (restore pixel value from backup volume), and Boost (increase pixel data value).

BRUSH EDITING: The operator may use a square brush, sized from 1×1 to 5×5 pixels, to "paint" areas of the image. One of five editing operations is applied to the pixels under the brush. The editing operations are Mark (set value to 255), Erase (set value to 0), RubOut (restore pixel value), Backup (restore pixel value from backup volume), and Boost (increase pixel data value).

Isolated points of the hard tissue of interest 12 and the fiducials 16 are rendered as a 3-dimensional surface representation in a step I. The rendering algorithm used in the preferred embodiment creates a manifold surface (e.g., isosurface) image using triangulation imaging techniques. In an alternate embodiment, ray tracing or volume rendering is also contemplated. Furthermore, it is also contemplated to render other objects along with the surface of interest (e.g., an external surface of the hard tissue of interest 12 and the fiducials 16) to judge the fit of the implant within the defect site. For example, it is important not to excessively press on the brain or protrude the overlying scalp, either may result in failure to heal, pain, and eventual extrusion of the implant. The surface of the segmented voxels are abstracted and converted to a triangular mesh representation. Triangle simplification methods are used to reduce the number of triangles. It is expected that this will produce an anti-aliased, triangulated surface mesh.

To assist the triangulation process, the slice data may be interpolated so as to increase the number of slices by a factor of four (4) or more. Linear interpolation is preferably used because of the convex-hull property. To assist the segmentation process, the slice data may be interpolated so as to increase the pixel resolution by a factor of four (4) or more. A cubic interpolation method, such as B-spline or cubic-spline, is contemplated. In order to reduce the machine requirements, it is contemplated to perform these operations on-the-fly during the segmentation process.

Optionally, the respective measurements between the fiducials 16 in the fixed relationship to the subject 14 and in the surface representation are validated in a step J in order to verify that the surface rendering process has not compromised the image's accuracy. After the surface representation is rendered, the voxel data corresponding to the surface representation is prepared to produce a physical rendering, a hard model, of the defect site and as much surrounding anatomy as is necessary to design the prosthesis. This hard model is produced by a stereolithography (STL) process. As will be described below, the STL process is used for building a physical model of a medical device 30 (e.g., an implant), which fits (i.e., "drops") into a defect 32 of the hard tissue of interest 12. The implant is typically about 100 cm$^2$ and has tapered edges. Manual repair methods suffice for most defects less than half this size, however these methods are optimum for defects this size or larger. The implants have tapered edges to provide unambiguous seating and ease of fixation by microplating or suturing.

Then, a 3-dimensional model 34 of the hard tissue of interest 12 and the fiducials 16 is created in a step K. It is to be understood that the model 34 substantially represents the hard tissue of interest 12, including the defect 32; therefore, the reference numeral 34 has been included in FIG. 1. Optionally, the respective measurements between the fiducials 16 in the fixed relationship to the subject 14 and in the 3-dimensional model are validated in a step L to insure accuracy for the last time of the STL produced patient model with dimensions taken from the patient prior to imaging. Then, a 3-dimensional model of the medical device 30 (e.g., an implant), which is to be implanted into the subject, is created in a step M. The process stops in a step N. The process of creating the implant 30 is discussed in more detail below.

Once created, the model of the implant 30 is given to a skilled anaplast for preparation of an implant, that may be seated in the subject 14, using an acrylic material, PMMA (polymethylmethacrylate). These methods apply to any material that the surgeon and anaplast agree to use. Currently only bioinert (biocompatible) materials such as silastic, titanium, or PMMA have been considered appropriate, however the correct implant configuration for tissue engineered (i.e., resorbable) implants can be obtained with the same methods. The anaplast feathers the edge of the implant so that it fits unambiguously against the defect 32 in the subject's tissue of interest 12. The thickness of a PMMA implant is typically about six mm thick. The curvature of the implant 30 is designed to conform to the subject's anatomy 12. A good fit is necessary for cranial implants in order to insure protection of the underlying brain from trauma and infection and that the overlying scalp receives a sufficient blood supply. Optionally, the implant 30 and model 34 of the hard tissue of interest 12 are gas sterilized for later use by a surgeon. Sterilization would not be necessary if a sterile production process were used.

The anaplast manually identifies and labels anatomical landmarks. It is expected that later techniques will use computer-assisted landmark labeling. As time permits, the anatomical ridge curves and geodesics are also identified. The SASE program uses landmarks, ridge curves, and geodesics.

To warp a mirrored skull, three-dimensional regions containing the landmarks are constructed to create a mirrored version of the skull. The mirrored version to the original skull shape and matching landmarks are warped (morphed). This will get the surfaces close to their desired position. The warp is refined to fit the surfaces to each other. As time permits, the ridge curves and geodesics in the skull shape (and its mirror image) are also identified. This information is used to warp (morph) the mirrored skull to the original. This will give a better initial fit. This method, or similar methods, have been implemented in the SASE program.

If the defect spans the midline, standard skull data is warped (morphed) to the subject skull shape and matching landmarks. As time permits, the ridge curves and geodesics are also used in addition to the landmarks. Standard skull data may be used in place of, or as a supplement to, mirrored skull data.

An implant shape is defined by finding a defect margin in a skull surface and transferring the defect margin to the warped skull surface. The warped skull surface is pinned down at the defect margin and all points exterior to the defect region. The warped skull surface tangents are also pinned down at the defect margin. An outer surface shape is determined by using the warped skull surface in the defect region to estimate the original patient skull surface. The maximum curvature is reduced while keeping the internal volume constant. If the subject has reduced brain volume and correspondingly less overlaying skin, the defect surface is flattened, thereby reducing the internal volume.

Optionally, an inner, ball-bearing surface that is about 6 mm from the warped outer surface is determined to add thickness treatment.

Edge Seating and taper treatment are applied at the defect margin by trimming the outer surface where the subject's skull falls about 1 mm below the warped outer surface. From this point, a smooth taper is made to the inner, ball-bearing surface. The taper is about 1 cm long. Walls are formed at the edges for resulting in the desired implant shape.

During an implantation process, the surgeon first test-fits the implant 30 against the defect 32. If necessary, the surgeon adjusts the dimensions of the implant 30 by grinding away excess material. Tapered edges facilitate these types of adjustments. If desired, the surgeon drills pairs of holes in a middle portion of the implant 30 for a suturing thread. For example, holes in the implant allow placement of sutures through the subject's tissue 12, the suture thread is pulled tight and tied, thus raising dura mater (internally) or the temporalis muscle cleave (externally) to the implant 30, or placement of temporary or permanent drains into the implant site. The implant 30 is secured to the subject's tissue 12 using titanium buttress plates and screws or sutures. Screw holes are optionally pre-drilled to reduce stress on the tissue 12 (e.g., bone) and the implant.

It is to be understood that the image data is converted to respective file formats at appropriate steps in the method discussed above. For example, image data is converted to a format for the rendering algorithm before the rendering step I. Also, the data representing the surface representation is formatted to the STL machine, using appropriate software, before the 3-dimensional models are created.

It is to be understood that corrections may be made (e.g., mathematically) to the 3-dimensional surface representation and the 3-dimensional model if it is determined that inaccuracies (image acquisition errors) are included in the measurements between the fiducials after the respective steps. As a general rule, however, the earlier the corrections are made in the process, the less expensive it is to implement. For example, it is less expensive to correct image acquisition errors in the 3-dimensional surface representation than in the 3-dimensional model. Corrections avoid the expense and inconvenience of acquiring a new volume image.

It is contemplated in alternative embodiments to create a computerized model of the implant from the segmentation data created by the AUTO program, thereby eliminating the need to create a physical model of the part of the body where the implant 30 is to be installed. One way in which this may be accomplished is to transmit the data created by the segmentation step H to an algorithm that uses normative sampling data (e.g., from humans) on a particular part of the subject where the implant 30 is to be installed. Such an algorithm best fits or warps the normalized data sampling to the scanned, segmented data from the segmentation algorithm to create a computer model of the implant 30. Then, the implant 30 (or a mold of the implant 30) is created using a 3-dimensional manufacturing tool.

Normative images are used by first gathering appropriate information about the subject (e.g., sex, race, and date of birth). Then, an operator locates appropriate x-ray images. Fiducial pin-holes are placed in a known geometry in the lateral and frontal x-ray images. The operator aligns a reference grid associated with the subject to the fiducial pin-holes in lateral and front views of the image. Landmark registration is performed by causing a mesh of anatomical reference points to be superimposed upon the lateral and frontal x-ray images. More specifically, using a knowledge of the anatomy depicted in the x-ray image, the operator moves the vertices of the mesh to the appropriate anatomical features. Alternatively, automatic landmark detection is available. Furthermore, it is contemplated to use previously stored images and/or permit the current image (or portions thereof) to be stored.

The key aspect of the preferred protocol that enables the development of a precisely aligned implant (i.e., a "drop-in" implant) is the use of the fiducials 16. Note, however, that the invention is not specifically limited to lead fiducials as described here, but also encompasses other techniques of providing a precise reference marker on the subject's image, which can be subsequently used to verify the dimensions of the implant. The imaging of the fiducials and the data representing the geometry of these elements with respect to each other is used by the steps in the method to ensure that the implant has proper dimensions.

With reference again to FIG. 4, the frame 20 provides a defined geometrical reference for three-dimensional Computed Tomography (3D CT) to be used to create verified 3D spatial coordinates. 3D CT is a medical imaging technique that uses x-ray radiation to view cross sectional slices of the subject's 14 anatomy. The slices are assembled to form a 3D representation of the subject's 14 anatomy. To ensure that the digital representation of the subject's 14 anatomy is the correct size, the defined reference frame 20 is established within the imaged field of view. This reference frame 20 requires no relative movement between markers 17. The frame 20 is rigidly attached to the subject 14 so that movement can be detected. Movement of the subject 14 during a scan may result in inaccuracies. The defined reference frame 20 is used to verify anatomical dimensions used for the production of correctly sized implants. Due to the scheduling of the scans, simple pre-scan patient preparation is desired. Post-scan confirmation of the measurements of the reference frame should be easy. The geometrical reference frame 20 is preferably used on the subject's 14 head or face, for use with the design of cranial-facial implants.

The practice of comparing the physical model produced by the STL machine with inter-fiducial distances measured on the subject 14 must be revised accordingly because the new fiducials are not as close to the skull. As discussed below, bridges are created between each fiducial 17 and the hard tissue of interest 12 (skull) so that the inter-fiducial distances may be verified on the model 34 produced by the STL machine. With the use of the fiducials 17 that are further away from the skull 12, pseudo-fiducials are added by the operator during segmentation so that those inter-pseudo-fiducial measurements may be verified on the 3D model 34. After the inter-fiducial distances are verified to be correct, pseudo-fiducials are created and compared throughout the remainder of the model production procedure.

The frame 20 may be assembled using an existing dental facebow 40 (WhipMix), which may be made of aluminum. Modifications are made to rigidly attach at least four (4) non-coplanar radiographic points 42. The fiducials 17 (e.g., lead spots) (Beekley) or other markers are attached to the points 42. Rigid attachment of the fiducials 17 may present a problem as the width and height of the facebow 40 varies to accommodate sizing for different subjects. A separate assembly can be attached to the facebow 40 that would define fiducials with out reference to the geometry of the facebow 40. Rods 44 and/or cross-rods 46 may be attached to the facebow to help detect subject motion.

The facebows 40 are readily available from various dental supply companies. The point markers 42, which are attached to the facebow 40, must not move in relation to each other and, when the scan is taking place, cannot move with respect to the subject 14. The relative location of the markers 42 may vary from subject to subject. Facebows 40 typically attach to the subject on the nasion 48 (bridge of nose) and external auditory meati 50. A hand tightening screw preferably secures the nasion attachment. By tightening the nasion pad to the nasion, the external auditory meati (external ear holes) pads are pulled forward and secured by pressure.

Figure 5:
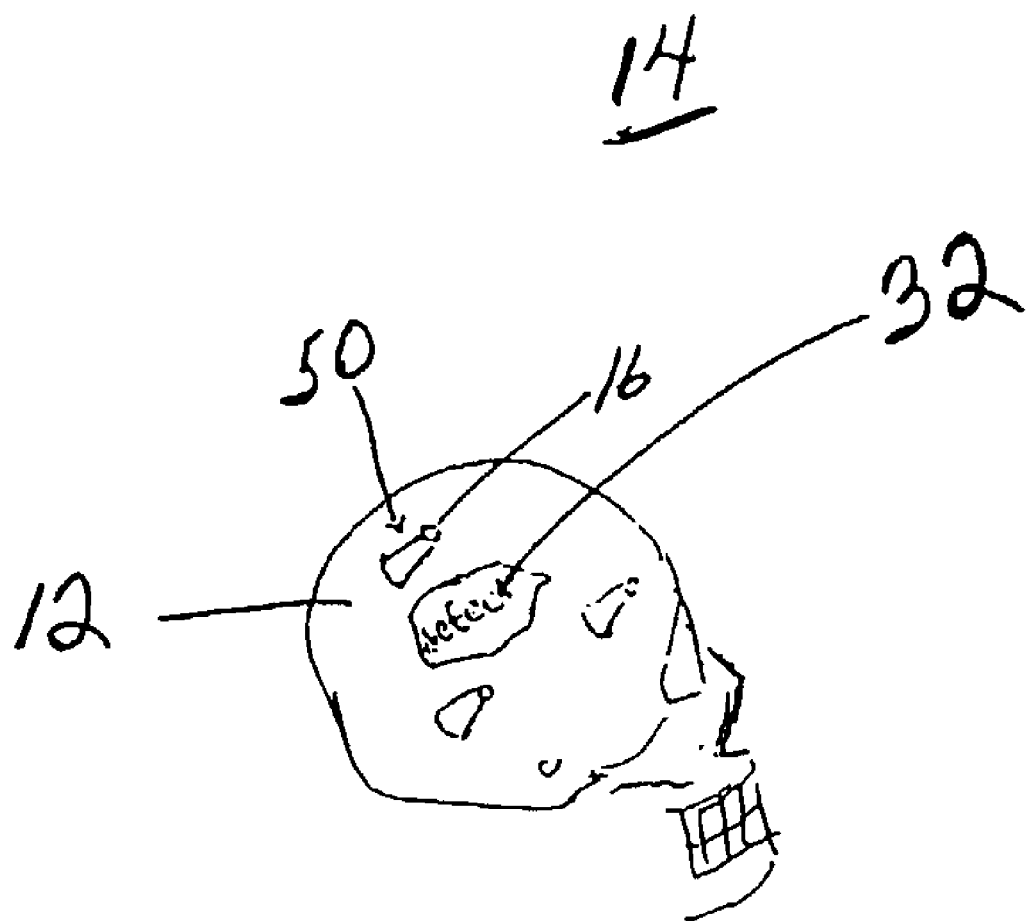
FIG. 5 illustrates a manually constructed bridge between the fiducials and the hard tissue of interest added to the image according to the present invention.

Optionally, with reference to FIGS. 3 and 5, in addition to the segmentation step H, the operator marks the position of the fiducials 16 for creating a bridge 50. It is to be understood that FIG. 5 represents an exaggerated depiction of the subject 14 including the hard tissue of interest 12. The bridges 50 represent links or leads between the fiducials 16, which are located on or above the surface of the subject's skin, and the hard tissue of interest 12, which may be located below the surface of the skin.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of designing a customized implant that is configured to correct a defect in a tissue of interest in a patient, the method comprising:
   positioning a plurality of fiducials in a fixed relationship to the patient;
   obtaining image data representing a volume image of the fiducials and the tissue of interest;
   validating respective measurements between the fiducials in the fixed relationship to the patient and in the image data;
   correcting for image acquisition errors detected in the validating step;
   segmenting the tissue of interest and the fiducials from the image data;
   rendering points of the tissue of interest and the fiducials as a 3-dimensional surface representation;
   creating a 3-dimensional model of the tissue of interest and the fiducials as a function of the 3-dimensional surface representation, thereby defining a 3-dimensional model of the defect in the tissue of interest; and
   creating a 3-dimensional model of the implant based on the 3-dimensional model of the defect.

2. The method as set forth in claim 1, wherein the step of positioning the fiducials includes:
   placing markers on the patient, the markers having a density where each creates an identifiable spot in the volume image.

3. The method as set forth in claim 1, wherein the step of positioning the fiducials includes:
   placing a frame of or separate markers, which have sufficient density to create an identifiable constellation of spots in the volume image, on an external surface of the patient to surround the tissue of interest.

4. The method as set forth in claim 1, wherein the step of validating includes:
   comparing distances between the fiducials, seen in the volume image of the fiducials and the tissue of interest, to distances collected prior to the image acquisition.

5. The method as set forth in claim 1, further including:
   validating respective measurements between the fiducials and in the 3-dimensional surface representation of the tissue of interest and the fiducials.

6. The method as set forth in claim 5, further including:
   validating respective measurements between the fiducials in the fixed relationship to the patient, taken before the patient is imaged, compared to the analogous dimensions seen in the volume image and the 3-dimensional model of the tissue of interest and the fiducials.

7. The method as set forth in claim 1, further including:
   interpolating the image data for smoothing and resolving image resolution of the surface representation.

8. The method as set forth in claim 1, wherein the segmenting step includes:
   bridging the fiducials to the tissue of interest.

9. A method for determining a shape of a medical device to be implanted into a subject, the method comprising:
   positioning a plurality of markers around the subject;
   obtaining 3-dimensional image data of the markers and a tissue of interest included in the subject;
   confirming respective measurements between the markers around the subject and in the image data;
   identifying the tissue of interest and the markers in the image data;
   rendering points of the tissue of interest and the markers as a 3-dimensional surface representation;
   generating a 3-dimensional model of the tissue of interest and the markers as a function of the surface representation; and
   determining a shape of the medical device to be implanted into the subject as a function of the 3-dimensional model.

10. The method as set forth in claim 9, wherein the 3-dimensional image data is represented as voxels, the rendering step including:
    producing a solid rendering of the voxel data.

11. The method for determining a shape of a medical device as set forth in claim 9, wherein the rendering step includes:
    producing an iso-surface image of the tissue of interest and the fiducials.

12. The method as set forth in claim 9, wherein the rendering step includes:
    rendering an external surface of the tissue of interest.

13. The method as set forth in claim 9, wherein the positioning step includes:
    placing markers on the subject, the markers having a density for creating an identifiable spot in the 3-dimensional image data.

14. The method as set forth in claim 9, further including:
    confirming respective measurements between the markers on the subject as the markers on the subject were before imaging and the markers in the 3-dimensional surface representation, and
    confirming respective measurements between the markers on the subject as the markers on the subject were and the markers in the 3-dimensional model of the tissue of interest and the markers.

15. The method as set forth in claim 14, further including:
    after any one of the confirming steps, correcting for positional errors detected in the respective confirming step.

16. A system for determining a shape of a medical device to correct a defect in a tissue of interest in a patient, the system comprising:
    a plurality of fiducials positioned on the patient;
    means for obtaining 3-dimensional image data of the fiducials and the tissue of interest included in the patient;
    means for validating respective measurements between the fiducials around the patient and in the image data;
    means for correcting at least some errors detected by the validating means;
    means for identifying the tissue of interest and the fiducials in the image data;
    means for rendering points of the tissue of interest and the fiducials as a 3-dimensional surface representation;
    means for generating a 3-dimensional model of the tissue of interest and the fiducials as a function of the surface representation; and means for determining the shape of the medical device as a function of the 3-dimensional model.

17. The system as set forth in claim 16, further including: a frame on which the fiducials are attached, the frame being placed around the patient.

18. The system as set forth in claim 16, wherein the means for validating compares distances between the fiducials on the patient to the distances between the fiducials as the fiducials appear in the 3-dimensional surface representation.

19. The system as set forth in claim 16, wherein the means for rendering produces an iso-surface of the tissue of interest and the fiducials.

* * * * *